United States Patent
Sadakane

(10) Patent No.: US 9,995,265 B2
(45) Date of Patent: Jun. 12, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventor: Shinji Sadakane, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 5 days.

(21) Appl. No.: 15/161,834

(22) Filed: May 23, 2016

(65) Prior Publication Data

US 2016/0348631 A1    Dec. 1, 2016

(30) Foreign Application Priority Data

May 25, 2015  (JP) .................................. 2015-105587
Mar. 14, 2016  (JP) .................................. 2016-049460

(51) Int. Cl.
| | | |
|---|---|---|
| *F02P 5/04* | (2006.01) | |
| *F02D 41/00* | (2006.01) | |
| *F02D 41/12* | (2006.01) | |
| *F02D 41/14* | (2006.01) | |
| *F02D 41/30* | (2006.01) | |

(52) U.S. Cl.
CPC .......... *F02P 5/045* (2013.01); *F02D 41/0005* (2013.01); *F02D 41/005* (2013.01); *F02D 41/0007* (2013.01); *F02D 41/0072* (2013.01); *F02D 41/12* (2013.01); *F02D 41/1454* (2013.01); *F02D 41/3029* (2013.01);
(Continued)

(58) Field of Classification Search
CPC .. F02P 5/045; F02D 41/0007; F02D 41/3029; F02D 41/005; F02D 41/0005; F02D 41/0072; F02D 41/1454; F02D 41/12; F02D 2041/0017; Y02T 10/42; Y02T 10/47

See application file for complete search history.

(56) References Cited

U.S. PATENT DOCUMENTS

| | | | |
|---|---|---|---|
| 5,722,363 A | | 3/1998 | Iida et al. |
| 5,979,396 A | * | 11/1999 | Yasuoka ................. F02D 33/00 123/295 |

(Continued)

FOREIGN PATENT DOCUMENTS

| | | |
|---|---|---|
| JP | 2000-154751 A | 6/2000 |
| JP | 2005-113884 A | 4/2005 |

(Continued)

*Primary Examiner* — Joseph Dallo
(74) *Attorney, Agent, or Firm* — Hunton Andrews Kurth LLP

(57) ABSTRACT

An internal combustion engine is provided with an EGR device and is configured to be capable of executing an operation based on a first air-fuel ratio and an operation based on a second air-fuel ratio leaner than the first air-fuel ratio. In a case where an ECU decreases the amount of air flowing into a combustion chamber and decreases an EGR rate in response to a predetermined torque reduction request for the internal combustion engine, the ECU performs the operation based on the first air-fuel ratio in a case where an immediately preceding EGR rate immediately before the torque reduction request is made is lower than a first threshold and performs a stratified combustion operation based on the second air-fuel ratio in a case where the immediately preceding EGR rate is equal to or higher than the first threshold.

5 Claims, 9 Drawing Sheets

(52) U.S. Cl.
CPC ....... *F02D 2041/0017* (2013.01); *Y02T 10/42* (2013.01); *Y02T 10/47* (2013.01)

(56) References Cited

U.S. PATENT DOCUMENTS

| | | | | |
|---|---|---|---|---|
| 6,058,906 | A * | 5/2000 | Yoshino | F02D 33/00 123/295 |
| 6,668,795 | B1 * | 12/2003 | Shimada | F02D 41/221 123/350 |
| 7,565,892 | B1 * | 7/2009 | Cleary | F02B 17/005 123/295 |
| 2002/0020393 | A1 * | 2/2002 | Ogawa | F02B 17/005 123/406.26 |
| 2002/0189581 | A1 * | 12/2002 | Gaessler | F02D 13/0207 123/295 |
| 2004/0159307 | A1 * | 8/2004 | Ogawa | F02D 41/123 123/295 |
| 2005/0098154 | A1 | 5/2005 | Ohtani | |
| 2006/0005804 | A1 * | 1/2006 | Kuo | F02D 13/0207 123/295 |
| 2006/0196466 | A1 * | 9/2006 | Kuo | F01L 1/344 123/295 |
| 2006/0196469 | A1 * | 9/2006 | Kuo | F02M 26/01 123/305 |
| 2011/0295487 | A1 * | 12/2011 | Ramappan | F02B 1/12 701/103 |

FOREIGN PATENT DOCUMENTS

| | | |
|---|---|---|
| JP | 2005-146885 A | 6/2005 |
| JP | 2010-007581 A | 1/2010 |
| JP | 2010-053716 A | 3/2010 |

* cited by examiner

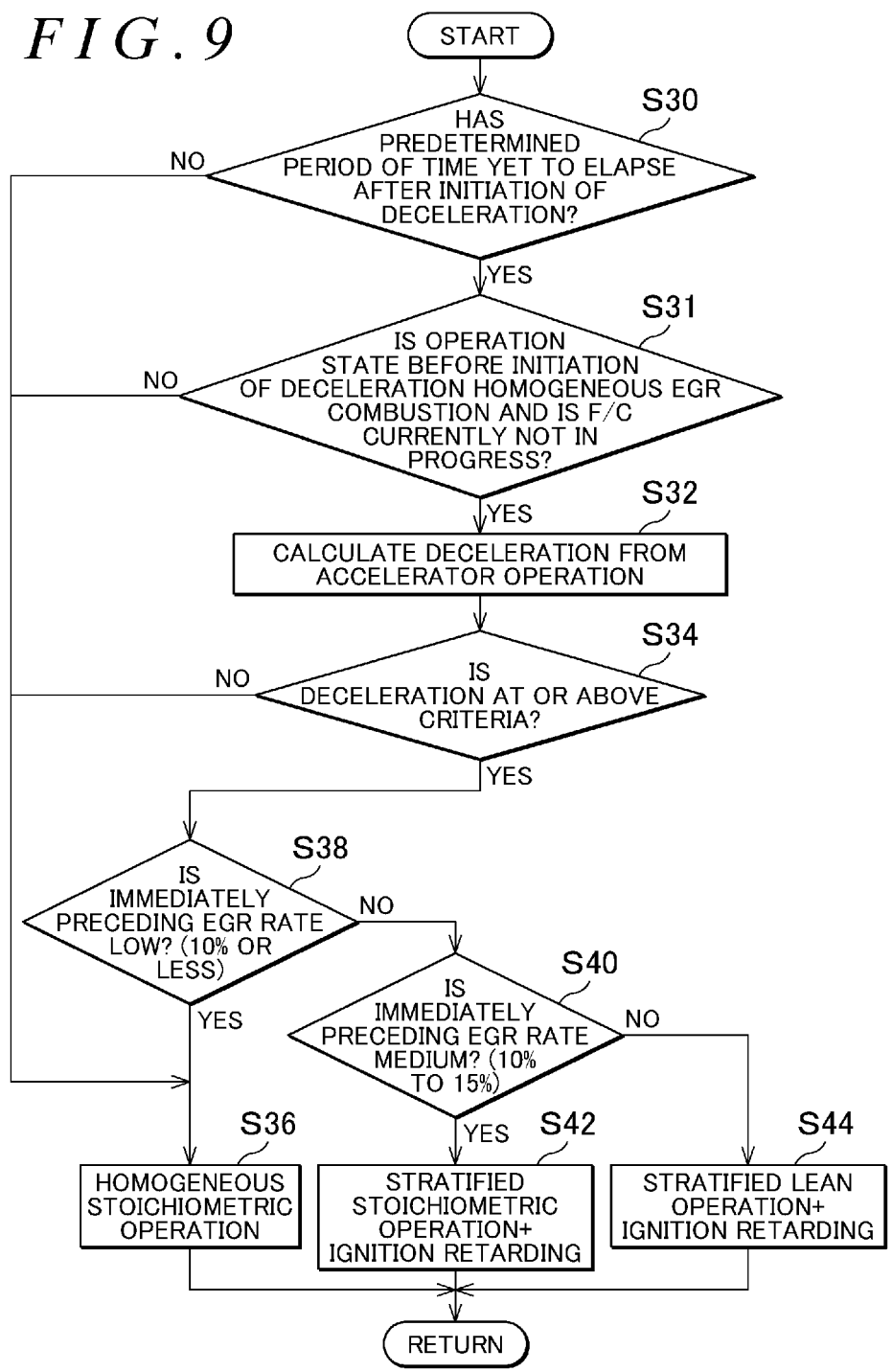

CONTROL DEVICE FOR INTERNAL COMBUSTION ENGINE

INCORPORATION BY REFERENCE

The disclosure of Japanese Patent Application No. 2015-105587 and 2016-049460 filed on May 25, 2015 and Mar. 14, 2016 including the specification, drawings and abstract is incorporated herein by reference in its entirety.

BACKGROUND OF THE INVENTION

1. Field of the Invention

The invention relates to a control device for an internal combustion engine.

2. Description of Related Art

A technique related to a control of an internal combustion engine that is provided with an EGR device is disclosed in, for example, Japanese Patent Application Publication No. 2010-53716 (JP 2010-53716 A). According to this technique, switching of forms of combustion to stratified combustion is performed in a case where an EGR amount in an operation state immediately before deceleration is equal to or larger than a predetermined value at a time of a transition to a deceleration operation of the internal combustion engine during EGR execution. During the stratified combustion, resistance against EGR gas is enhanced so that a fuel is distributed at a high concentration in the vicinity of a spark plug. Then, combustion instability such as a misfire is suppressed even in a case where the amount of residual EGR is large.

SUMMARY OF THE INVENTION

The above-described technique has a certain effect in suppressing the occurrence of the misfire in a case where an EGR rate is high. Depending on operation conditions of the internal combustion engine, however, a control at a high EGR rate at which a complete response is impossible with the form of combustion becoming the stratified combustion alone is also assumed. In this case, a higher in-cylinder temperature or the like becomes effective to further enhance the resistance against the EGR gas. Although an increase in an in-cylinder air amount is conceivable as a method for raising the in-cylinder temperature, a control for simply increasing the in-cylinder air amount to focus only on the suppression of a deterioration of the combustion causes a problem to arise with a torque reduction request not being satisfied and a sense of deceleration not being achieved.

The invention provides a control device for an internal combustion engine that allows a deterioration of combustion to be suppressed without a sense of deceleration being impaired with respect to a torque reduction request during EGR introduction.

A control device for an internal combustion engine according to a first aspect of the invention has the following configuration. The internal combustion engine has an air amount adjusting device, a fuel supply device, and an EGR device. The air amount adjusting device adjusts the amount of air flowing into a combustion chamber of the internal combustion engine. The fuel supply device supplies a fuel into the combustion chamber. The EGR device adjusts an EGR rate, the EGR rate being a ratio of exhaust gas in the air flowing into the combustion chamber. The internal combustion engine is configured to execute an operation based on a first air-fuel ratio and an operation based on a second air-fuel ratio leaner than the first air-fuel ratio by adjusting the air amount adjusting device and the fuel supply device. The control device includes an electronic control unit. The electronic control unit is configured to perform an operation mode switching control by: i) performing the operation based on the first air-fuel ratio in a case where the electronic control unit decreases the amount of the air flowing into the combustion chamber in response to a predetermined torque reduction request and decreases the EGR rate by adjusting the EGR device and where an immediately preceding EGR rate, which is the EGR rate immediately before the torque reduction request is made, is lower than a first threshold, and ii) performing a stratified combustion operation based on the second air-fuel ratio in a case where the immediately preceding EGR rate is equal to or higher than the first threshold.

According to the control device described above, the operation mode switching control is performed in a case where the amount of the air is decreased and the EGR rate is decreased in response to the torque reduction request for the internal combustion engine. During the operation mode switching control, the operation based on the first air-fuel ratio is performed in a case where the immediately preceding EGR rate immediately before the torque reduction request is made is lower than the first threshold and the stratified combustion operation based on the second air-fuel ratio leaner than the first air-fuel ratio is performed in a case where the immediately preceding EGR rate is equal to or higher than the first threshold. During the stratified combustion operation, a dense air-fuel mixture is formed in the vicinity of a spark plug, and thus appropriate ignition and combustion are likely to be ensured even when the air-fuel ratio becomes a leaner air-fuel ratio. Accordingly, the stratified combustion operation based on the second air-fuel ratio causes an in-cylinder air amount to be increased without combustion stability being sacrificed, and thus an in-cylinder temperature can be raised. In addition, the second air-fuel ratio is likely to satisfy the torque reduction request as the air-fuel ratio is leaner than the first air-fuel ratio. Hence, according to the control device described above, a deterioration of combustion during EGR introduction can be suppressed without a sense of deceleration being impaired.

In the control device described above, the first air-fuel ratio may be a theoretical air-fuel ratio.

According to the control device described above, stratified combustion based on a lean air-fuel ratio that is leaner than the theoretical air-fuel ratio is performed in a case where the immediately preceding EGR rate exceeds the first threshold. The stratified combustion based on the lean air-fuel ratio is effective to enhance a combustion deterioration avoidance effect, but a large amount of NOx is discharged due to the stratified combustion based on the lean air-fuel ratio. Accordingly, if the combustion based on the lean air-fuel ratio is performed at all times, a complete response might be impossible in a system configuration assuming the theoretical air-fuel ratio. According to the control device described above, the combustion is performed based on the theoretical air-fuel ratio in a region where the EGR rate is low, and thus the deterioration of the combustion and a deterioration of emission can be suppressed at the same time by a three-way catalyst or the like being effectively utilized.

In the control device described above, the electronic control unit may be configured to: iii) perform the stratified combustion operation in a case where the operation based on the first air-fuel ratio is performed in the operation mode switching control and where the immediately preceding EGR rate is equal to or higher than a second threshold lower than the first threshold, and iv) perform a homogeneous combustion operation in a case where the immediately preceding EGR rate is lower than the second threshold.

According to the control device described above, the operation based on the stratified combustion is performed in a case where the immediately preceding EGR rate is equal to or higher than the second threshold lower than the first threshold and the operation based on homogeneous combustion is performed in a case where the immediately preceding EGR rate is lower than the second threshold. The stratified combustion has a higher level of EGR resistance than the homogeneous combustion. According to the control device described above, switching between the forms of combustion is performed in accordance with the immediately preceding EGR rate, and thus the deterioration of the combustion during the EGR introduction can be suppressed by the EGR resistance being enhanced.

In the control device described above, the torque reduction request may include a request in which a deceleration calculated from the amount of an operation of an accelerator of the internal combustion engine is equal to or higher than a predetermined threshold.

According to the control device described above, the predetermined torque reduction request is made in a case where the deceleration determined from the accelerator operation amount is equal to or higher than the predetermined threshold. Hence, according to the control device described above, switching between the air-fuel ratios or the forms of combustion can be suppressed in a case where the deceleration is low and the EGR resistance does not have to be enhanced.

In the control device described above, the electronic control unit may be configured to operate an ignition device such that an ignition timing is further on a retard side than an optimum ignition timing in a case where the stratified combustion operation is performed in the operation mode switching control.

According to the control device described above, the ignition timing is further retarded than the optimum ignition timing in a case where the immediately preceding EGR rate immediately before the torque reduction request is made exceeds the second threshold. Once the ignition timing is changed toward the retard side, the air amount that is required for the generation of the same torque increases. Hence, according to the control device described above, the in-cylinder air amount can be further increased without an increase in the generated torque, and thus the EGR resistance can be further enhanced by the in-cylinder temperature being further raised.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 9 is a flowchart illustrating a routine that is executed by the ECU 50 of Embodiment 2 of the invention.

DETAILED DESCRIPTION OF EMBODIMENTS

Figure 1:
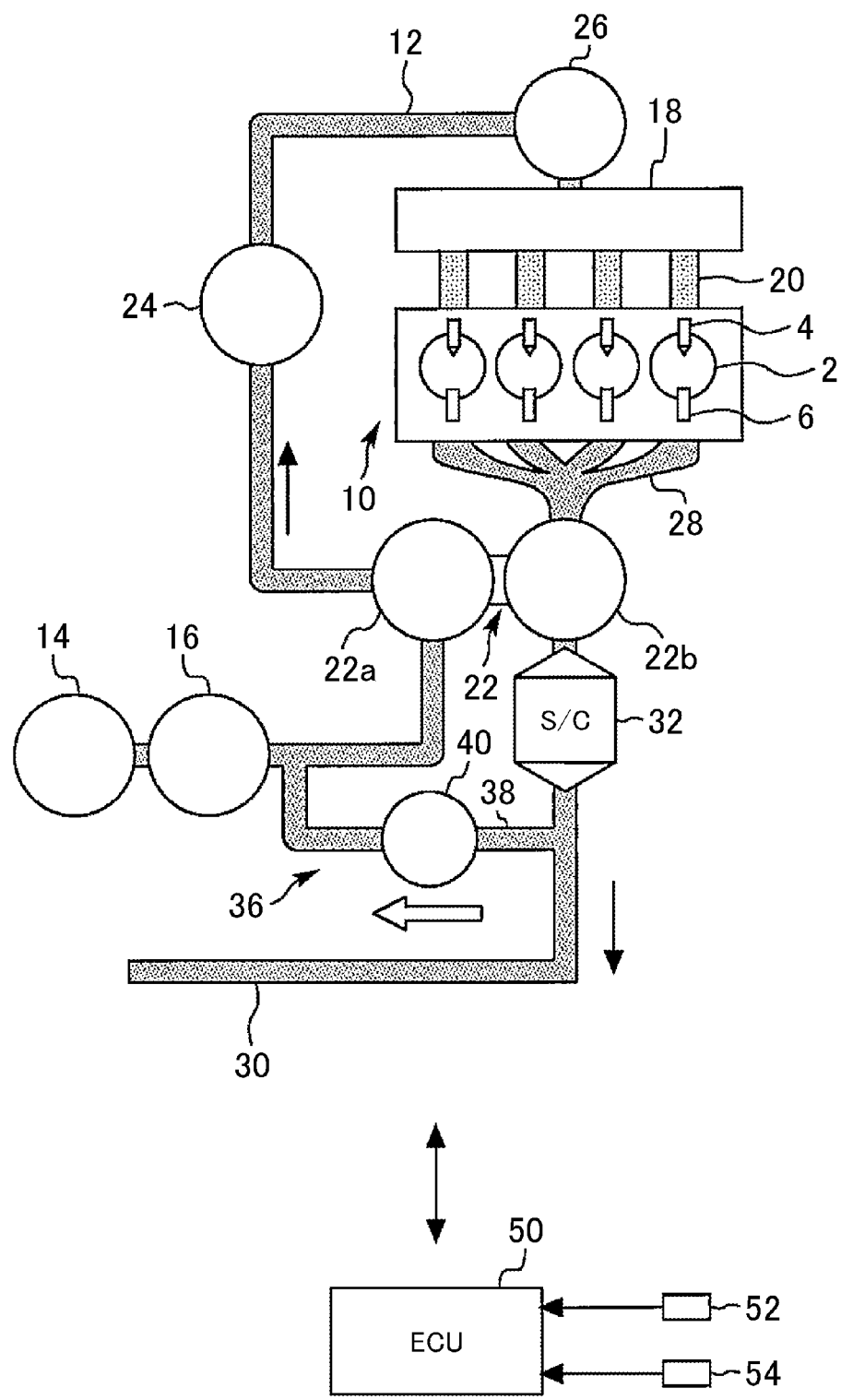
FIG. 1 is a drawing illustrating a schematic configuration of a system in which an internal combustion engine to which a control device according to Embodiment 1 of the invention is applied is mounted.

Hereinafter, embodiments of the invention will be described with reference to accompanying drawings. In a case where numbers such as the numbers, quantities, amounts, ranges, and the like of respective elements are mentioned in the following embodiments, the invention is not limited to the numbers except in a case where the numbers are particularly clarified and in a case where the numbers are specified to be obvious in principle. The structures, steps, and the like to be described in the following embodiments are not necessarily essential for this invention except in a case where the structures, steps, and the like are clarified to be essential for this invention and in a case where these are specified to be obviously essential in principle. The same reference numerals will be used to refer to elements common to all the drawings, and redundant description thereof will be omitted.

FIG. 1 is a drawing illustrating a schematic configuration of a system in which an internal combustion engine (hereinafter, simply referred to as an engine) to which a control device according to Embodiment 1 of the invention is applied is mounted. An engine 10 that is illustrated in FIG. 1 is a spark ignition-type four-stroke reciprocating engine. More specifically, the engine 10 is provided with four cylinders 2 that are in series with one another, and an in-cylinder fuel injection valve 4 and a spark plug 6 are disposed in each of combustion chambers of the respective cylinders 2. The in-cylinder fuel injection valves 4 directly inject a fuel into the combustion chambers, and the spark plugs 6 perform ignition on air-fuel mixtures in the combustion chambers.

The engine 10 is provided with an intake passage 12 for supplying air into the combustion chambers of the respective cylinders 2. An air cleaner 14 is attached to an inlet side of the intake passage 12. An air flow meter 16 is attached to the intake passage 12 on the downstream side of the air cleaner 14. The air flow meter 16 outputs a signal in accordance with the flow rate of the air that is suctioned into the intake passage 12. An outlet side of the intake passage 12 is connected to the combustion chambers of the respective cylinders 2 via a surge tank 18 and an intake manifold 20.

A compressor 22a of a turbocharger 22 is placed on the downstream side of the air flow meter 16 on the intake passage 12. An intercooler 24 for cooling intake air that is compressed by the compressor 22a is placed on the downstream side of the compressor 22a on the intake passage 12. A throttle valve 26 for adjusting the amount of the air that is supplied into the engine 10 is placed on the downstream side of the intercooler 24 on the intake passage.

The engine 10 is provided with an exhaust passage 30 for discharging exhaust gas. One end side of the exhaust passage 30 is connected to the combustion chambers of the respective cylinders 2 via an exhaust manifold 28. A turbine 22b of the turbocharger 22 is placed in the middle of the exhaust passage 30. A start catalyst (hereinafter, referred to as a "S/C") 32 is placed on the downstream side of the turbine 22b on the exhaust passage 30. The S/C 32 is a so-called three-way catalyst. The S/C 32 efficiently removes the three components of HC, CO, and NOx contained in the exhaust gas in the vicinity of a theoretical air-fuel ratio.

In addition, the engine 10 is provided with an EGR device 36 that causes a reflux of some of the exhaust gas into the cylinders. The EGR device 36 is provided with an EGR passage 38. One end of the EGR passage 38 is connected to the exhaust passage 30 on the downstream side of the S/C 32, and the other end of the EGR passage 38 is connected to the intake passage 12 between the air flow meter 16 and the compressor 22a. An EGR valve 40 for opening or closing the EGR passage 38 is disposed in the middle of the EGR passage 38. In other words, the EGR device 36 is configured as a so-called a low pressure side EGR (LPL-EGR) device that introduces EGR gas to an intake upstream side of the compressor 22a.

The engine system according to this embodiment is provided with an electronic control unit (ECU) 50. The ECU 50 is a control device that performs a total control of the engine system as a whole. The control device according to the invention is embodied as a function of the ECU 50.

The ECU 50 captures and processes signals of sensors of the engine system. In addition to the air flow meter 16 described above, a rotation speed sensor 52, an accelerator opening degree sensor 54, and the like are attached as the sensors. The rotation speed sensor 52 detects a crankshaft rotation speed, and the accelerator opening degree sensor 54 outputs the signal in accordance with an accelerator pedal opening degree. The ECU 50 operates each actuator in accordance with a predetermined control program by processing the respective captured sensor signals. The actuators that are operated by the ECU 50 include the in-cylinder fuel injection valve 4, the spark plug 6, the throttle valve 26, and the EGR valve 40 described above. Although a number of actuators and sensors other than those illustrated in the drawing are connected to the ECU 50 as well, description thereof will be omitted in this specification.

Hereinafter, an operation of the system according to this Embodiment 1 will be described with reference to the accompanying drawings. Engine controls that are executed by the ECU 50 include a combustion control for controlling a fuel distribution in the combustion chambers, an air-fuel ratio control for controlling an operation air-fuel ratio, and an EGR control for controlling an EGR rate.

During the combustion control, switching between a homogeneous combustion operation and a stratified combustion operation is performed. The homogeneous combustion operation is to form and burn a homogeneous air-fuel mixture in the entire combustion chambers, and the stratified combustion operation is to form and burn a dense air-fuel mixture layer in the vicinity of the spark plug 6. At a time of the homogeneous combustion operation, the operation is performed by the fuel being injected from the in-cylinder fuel injection valve 4 in an intake stroke. Then, the fuel that is injected from the in-cylinder fuel injection valve 4 is sufficiently diffused and is uniformly mixed with the air until being ignited.

At a time of the stratified combustion operation, the operation is performed by the fuel being injected from the in-cylinder fuel injection valve 4 in a compression stroke. The fuel injected into the combustion chamber in the compression stroke forms a dense air-fuel mixture layer in the vicinity of the spark plug 6. During the stratified combustion operation, the dense air-fuel mixture layer that is formed in the vicinity of the spark plug 6 in this manner is ignited, and thus appropriate ignition and combustion can be ensured even in an operation condition likely to lead to unstable combustion in the homogeneous combustion operation (such as a time of a cold start). Hence, a high level of combustion stability is achieved during the stratified combustion operation.

During the air-fuel ratio control, the actuators such as the throttle valve 26 and the in-cylinder fuel injection valve 4 are operated and switching is performed between a stoichiometric operation and a lean operation. The stoichiometric operation is to burn the air-fuel mixture that has the theoretical air-fuel ratio (stoichiometric), and the lean operation is to burn an air-fuel mixture that has a lean air-fuel ratio which is leaner than the theoretical air-fuel ratio.

During the EGR control, the actuator such as the throttle valve 26 and the EGR valve 40 is operated by a feedback control such that a state quantity such as the actual EGR rate and an actual EGR gas amount that has a correlation with the actual EGR rate corresponds to a target value.

Figure 2:
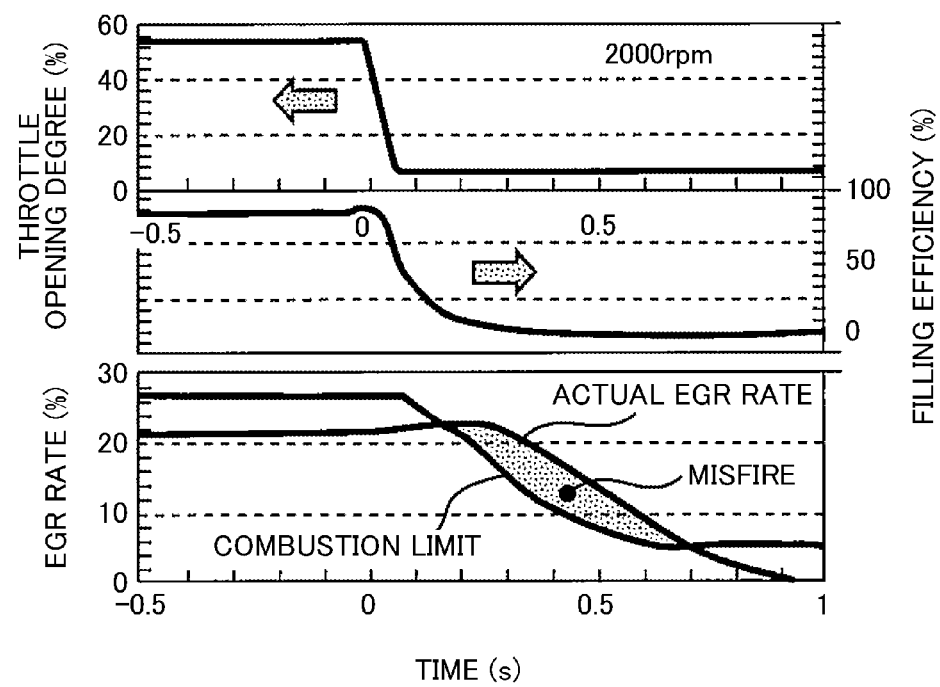
FIG. 2 is a time chart illustrating temporal changes in a throttle opening degree, a filling efficiency, and an EGR rate at a time of deceleration.

Hereinafter, a deceleration misfire at a time of EGR introduction will be described. FIG. 2 is a time chart illustrating temporal changes in a throttle opening degree, a filling efficiency, and the EGR rate at a time of deceleration. In a case where the engine 10 is subjected to a request for a significant torque reduction with an input to an accelerator pedal becoming OFF, for example, the throttle opening degree is reduced by the throttle valve 26 being adjusted. The filling efficiency decreases when the throttle opening degree is rapidly reduced. In an operation region where the filling efficiency is low, the EGR rate corresponding to a combustion limit is low, and thus a target EGR rate is reduced. Even when the target EGR rate is reduced, however, the actual EGR rate does not immediately change. This is because of the occurrence of a response delay of the EGR valve 40 that adjusts the EGR rate and a response delay equivalent to the volume of an EGR path from the EGR valve 40 to the throttle valve 26. Once the air that has an EGR rate which is higher than the target EGR rate is suctioned into the cylinders due to the response delay, the EGR rate exceeds the combustion limit and a misfire and an engine stall might occur.

Figure 3:
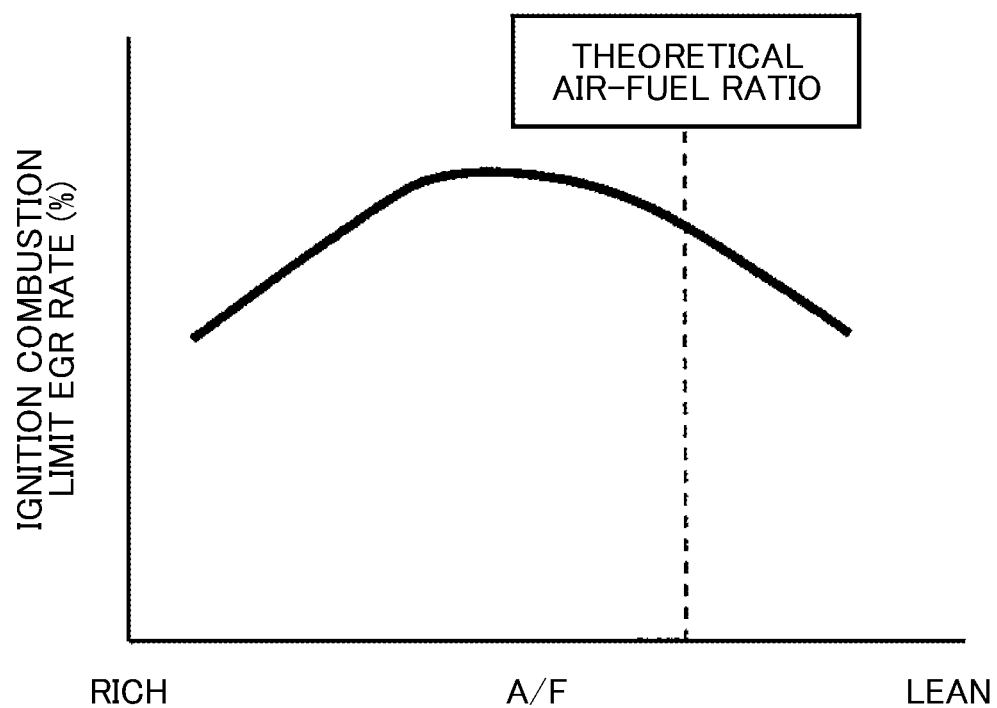
FIG. 3 is a drawing illustrating a combustion limit EGR rate with respect to an air-fuel ratio.

Not only the EGR rate reduction but also the optimization of the air-fuel ratio (A/F) or the like is conceivable for ignitability improvement at the time of the EGR introduction. FIG. 3 is a drawing illustrating a combustion limit EGR rate with respect to the air-fuel ratio. As illustrated in this drawing, the combustion limit EGR rate is maximized at a slight rich air-fuel ratio that is slightly richer than the theoretical air-fuel ratio. In this regard, a stratified stoichiometric operation being performed is conceivable as a method for avoiding the deceleration misfire at the time of the EGR introduction. The stratified stoichiometric operation is a form of operation in which the stratified combustion operation and the stoichiometric operation are performed. During the stratified stoichiometric operation, the air-fuel ratio in the vicinity of the spark plug 6 can be the slight rich air-fuel ratio that is richer than the theoretical air-fuel ratio, and thus the occurrence of the misfire can be suppressed by the combustion limit EGR rate being raised.

The homogeneous combustion operation based on the slight rich air-fuel ratio being performed is also conceivable as another example from the viewpoint of raising the combustion limit EGR rate. In the homogeneous combustion operation based on the slight rich air-fuel ratio, however, the amount of the fuel becomes larger than in the stratified stoichiometric operation of the equal air amount, and thus torque increases by that amount. Accordingly, in a case where the time of the deceleration when the torque is decreased to a certain value is assumed, for example, an in-cylinder air amount becomes larger in the stratified stoichiometric operation than in the homogeneous combustion operation based on the slight rich air-fuel ratio of the equal torque. Although described in detail later, ignitability is improved when the in-cylinder air amount increases. Accordingly, it can be said that the stratified stoichiometric operation is more advantageous than the homogeneous combustion operation based on the slight rich air-fuel ratio in terms of the raising of the combustion limit EGR rate.

In addition, to raise the temperature of the air-fuel mixture at a time of the ignition, that is, an in-cylinder temperature at a compression top dead center (TDC) is conceivable as another method for improving the ignitability. However, when the in-cylinder temperature at the TDC is raised at all times, knocking becomes more and more likely to occur, and thus a measure for raising the in-cylinder temperature at the TDC only at the time of the deceleration is desirable.

Figure 4:
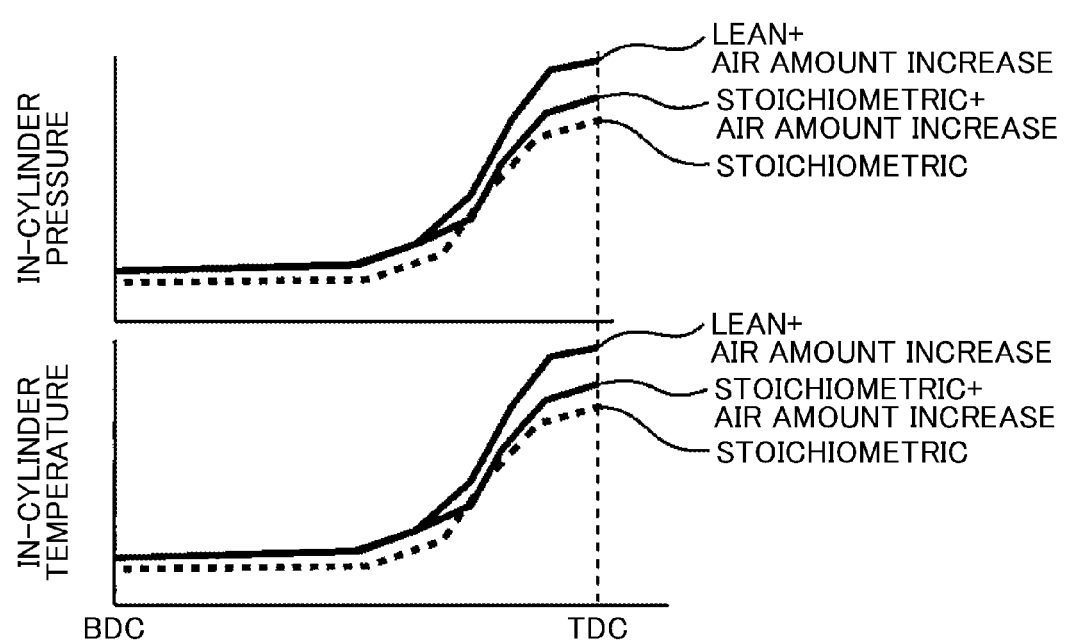
FIG. 4 is a drawing illustrating an in-cylinder pressure and an in-cylinder temperature with respect to a crank angle.
Figure 5:
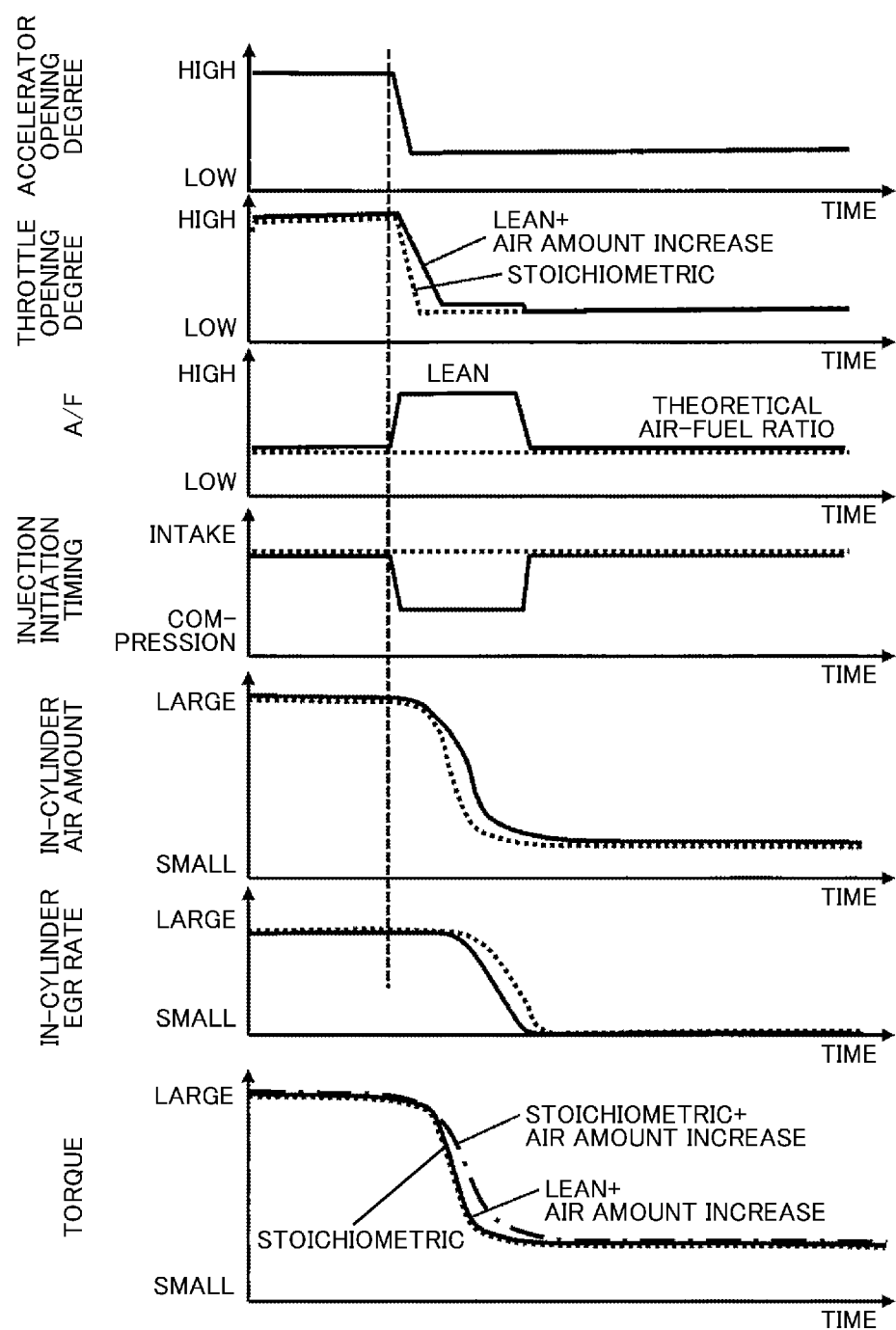
FIG. 5 is a time chart illustrating temporal changes in various state quantities at the time of the deceleration.

An increase in the in-cylinder air amount is effective as means for raising the in-cylinder temperature at the TDC. FIG. 4 is a drawing illustrating an in-cylinder pressure and the in-cylinder temperature with respect to a crank angle. FIG. 5 is a time chart illustrating temporal changes in various state quantities at the time of the deceleration. The solid lines in these drawings represent a case where the air amount is increased in the lean operation, the dotted lines in these drawings represent the stoichiometric operation, and the one-dot chain lines in these drawings represent a case where the air amount is increased in the stoichiometric operation.

As illustrated in FIG. 4, the increase in the in-cylinder air amount in the stoichiometric operation results in an in-cylinder pressure at the TDC higher than that in the case of no increase, and thus the in-cylinder temperature at the TDC increases. However, because the increase in the air amount in the stoichiometric operation causes the amount of the generated torque to become larger than in the case of no increase as illustrated in FIG. 5, a sense of deceleration at the time of the deceleration is impaired as well.

Once the in-cylinder air amount is increased in the lean operation, the in-cylinder pressure at the TDC becomes even higher than in the stoichiometric operation as illustrated in FIG. 4. In addition, because the air-fuel mixture in the lean operation is higher in specific heat ratio than the air-fuel mixture in the stoichiometric operation, the in-cylinder temperature at the TDC in particular becomes particularly high in the lean operation. Furthermore, the lean operation requires a larger air amount than the case of the stoichiometric operation to generate the same torque. Accordingly, if the switching from the stoichiometric operation to the lean operation is performed at the time of the deceleration, the in-cylinder air amount can also become larger, without an increase in the generated torque, than in a case where the stoichiometric operation is maintained. During the stratified combustion operation, the air-fuel ratio in the vicinity of the spark plug 6 can become richer than the air-fuel ratio of the entire combustion chambers as described above, and thus the occurrence of the misfire can be suppressed by the combustion limit EGR rate being raised.

It is apparent from the above that a so-called stratified lean operation in which the stratified combustion operation and the lean operation are performed is particularly effective as a method for improving the ignitability at the time of the EGR introduction without impairing the sense of deceleration.

Figure 6:
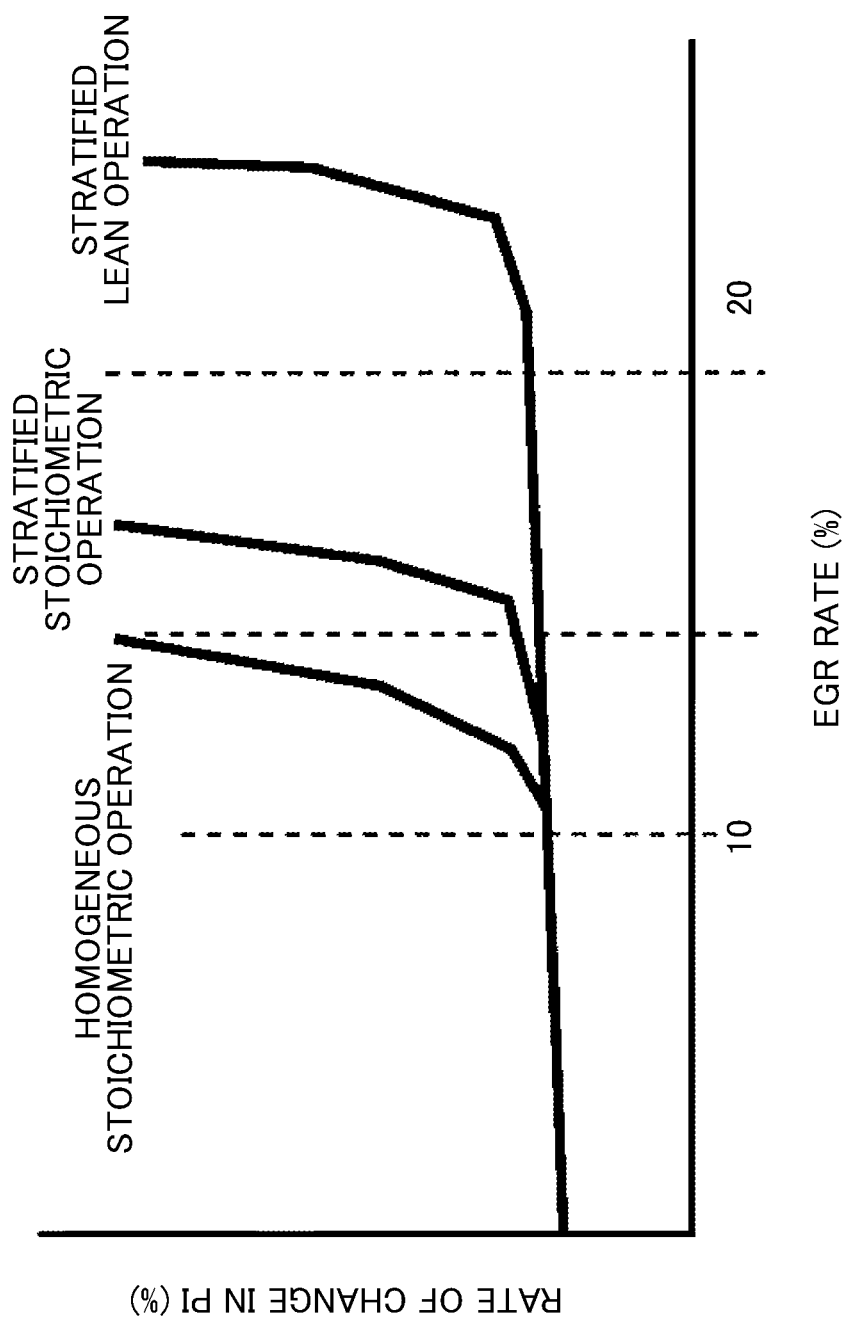
FIG. 6 is a diagram illustrating a rate of change in an indicated average effective pressure (PI) with respect to the EGR rate in various operation modes.

When the lean operation is frequently performed in the system that is provided with the three-way catalyst, however, a problem arises with regard to NOx discharge. Accordingly, a proper use of the stratified lean operation and the stratified stoichiometric operation described above is required as a countermeasure against the deceleration misfire at the time of the EGR introduction. FIG. 6 is a diagram illustrating a rate of change in an indicated average effective pressure (PI) with respect to the EGR rate in various operation modes. As is apparent from this drawing, combustion resistance with respect to the EGR rate is higher in the order of a homogeneous stoichiometric operation, the stratified stoichiometric operation, and the stratified lean operation.

In the system according to this embodiment, an operation mode switching control for a proper use of the three above-described operation modes in accordance with the EGR rate immediately before the deceleration is executed in a case where a predetermined torque reduction request (deceleration request) is made. The predetermined torque reduction request is a deceleration request that has the possibility of the occurrence of the misfire at the time of the EGR introduction, and can be determined by, for example, a comparison between a deceleration which is calculated from an accelerator operation and predetermined criteria. Herein, the deceleration is, for example, a value that is defined as a decrement of a required torque per unit time (that is, a torque gradient). The predetermined criteria described above are, for example, a deceleration corresponding to the combustion limit obtained from an operation state.

More specifically, during the operation mode switching control, the operation mode is switched to the stratified lean operation in a case where the EGR rate immediately before the deceleration belongs to a range of a predetermined high EGR rate (such as 15% or higher) in the case of the deceleration during the homogeneous stoichiometric operation and the operation mode is switched to the stratified stoichiometric operation in a case where the EGR rate immediately before the deceleration belongs to a range of a predetermined medium EGR rate (such as 10% to 15%) in the case of the deceleration during the homogeneous stoichiometric operation. An EGR rate that is a boundary between the medium EGR rate and the high EGR rate (first threshold) may be set to, for example, an upper limit of the EGR rate at which the deceleration misfire does not occur in the stratified stoichiometric operation. Then, the deceleration misfire at the time of the EGR introduction can be avoided and a deterioration of emission can be suppressed.

In addition, the homogeneous stoichiometric operation is maintained in a case where the EGR rate immediately before the deceleration belongs to a range of a predetermined low EGR rate (such as less than 10%) in a case where the predetermined deceleration request is made during the homogeneous stoichiometric operation. An EGR rate that is a boundary between the low EGR rate and the medium EGR rate (second threshold) may be set to, for example, an upper limit of the EGR rate at which the deceleration misfire does not occur in the homogeneous stoichiometric operation. Then, the deceleration misfire attributable to EGR can be effectively avoided.

Figure 7:
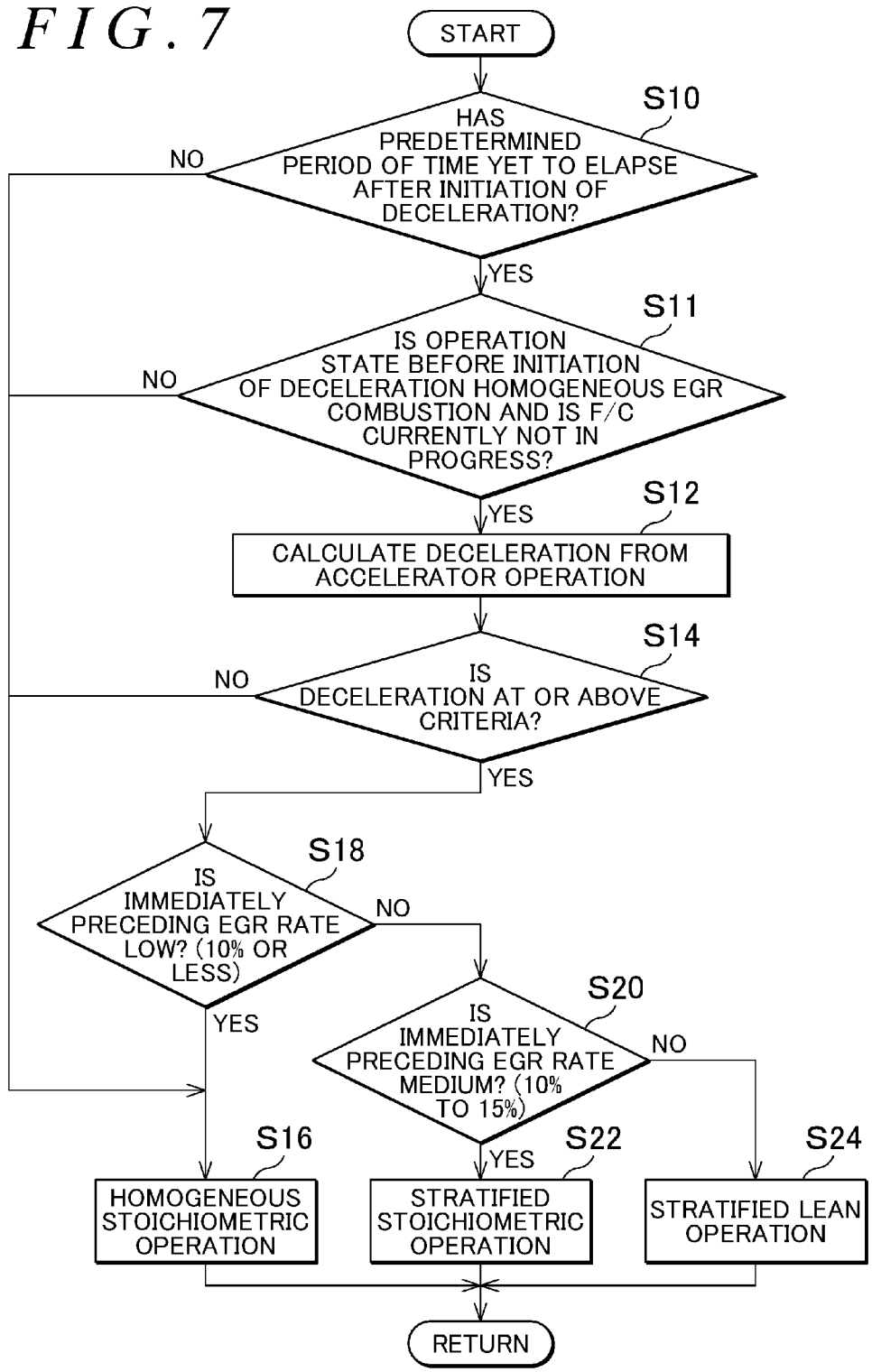
FIG. 7 is a flowchart illustrating a routine that is executed by an ECU 50 of Embodiment 1 of the invention.

Hereinafter, a specific processing of the operation mode switching control described above will be described in detail based on a flowchart. FIG. 7 is a flowchart illustrating a routine for the operation mode switching control that is executed by the ECU 50 of Embodiment 1 of the invention. The routine that is illustrated in FIG. 7 is repeatedly executed at a predetermined control cycle.

In the routine that is illustrated in FIG. 7, it is first determined whether or not a predetermined period of time has yet to elapse after the deceleration is initiated (Step S10). Specifically, it is determined whether or not the predetermined period of time has yet to elapse after the deceleration request is made. The predetermined period of time is, for example, a scavenging time that continues until scavenging of the EGR gas after the initiation of the deceleration. The predetermined period of time is calculated from an engine rotation speed that is detected by the rotation speed sensor 52 and an opening degree of the EGR valve 40. Methods for calculating the predetermined period of time are not limited to the above, and the time until the scavenging of the EGR gas may be stored in conformity with each engine rotation speed and EGR rate. In a case where it is determined in Step S10 that the deceleration has not yet initiated or the predetermined period of time has elapsed since the initiation of the deceleration as a result of the determination in Step S10, it is determined that a risk of the deceleration misfire is absent and the processing proceeds to Step S16 (described later).

In a case where it is determined in Step S10 that the predetermined period of time has yet to elapse after the initiation of the deceleration, it is determined that the risk of the deceleration misfire is present and the processing proceeds to the next step (Step S11), in which it is determined whether two conditions are satisfied. One of the two conditions is the operation state immediately before the initiation of the deceleration being a homogeneous EGR combustion and the other one of the two conditions is a fuel cut (F/C) being currently not in progress. Herein, the homogeneous EGR combustion is the homogeneous combustion operation entailing the EGR introduction. In a case where one or both are determined to be negative as a result of the determination in Step S11, it is determined that the risk of the deceleration misfire is absent and the processing proceeds to Step S16 (described later). In a case where both are determined to be satisfied in Step S11, the processing proceeds to the next step (Step S12), in which the deceleration is calculated from the accelerator operation. Specifically, the decrement of the required torque for the predetermined period of time (such as 100 msec) is calculated based on the detection signal of the accelerator opening degree sensor 54. Then, a target deceleration is calculated by the decrement of the required torque being divided by the predetermined period of time. The processing of Step S12 is executed in the first routine subsequent to the initiation of the deceleration. The processing of Step S12 is skipped in the following routines within the predetermined period of time after the initiation of the deceleration or the processing of Step S12 is updated only in a case where the calculated deceleration exceeds the previous value. In a case where it is determined in Step S10 that the predetermined period of time has elapsed since the initiation of the deceleration, the deceleration calculated in Step S12 is temporarily cleared and re-calculated in the first routine subsequent to the initiation of the next deceleration.

Then, it is determined whether or not the deceleration calculated in Step S12 is at or above the predetermined criteria (Step S14). The predetermined criteria are a value for determining the possibility of the misfire attributable to the deceleration. The predetermined criteria are set to, for example, an upper limit deceleration at which no deceleration misfire is caused by a homogeneous stoichiometric combustion operation even when the EGR rate is the high EGR rate (such as 15% or higher). In a case where it is determined as a result of the determination in Step S14 that the deceleration is below the criteria, it is determined that the risk of the deceleration misfire is absent and the processing proceeds to the next step (Step S16), in which the homogeneous stoichiometric operation is executed.

In a case where it is determined in Step S14 that the deceleration is at or above the criteria, it is determined that the risk of the deceleration misfire is present. Then, the processing proceeds to the next step (Step S18), in which it is determined whether or not the EGR rate immediately before the deceleration belongs to the range of the predetermined low EGR rate (such as the range of less than 10%). In a case where it is determined as a result of the determination in Step S18 that the EGR rate immediately before the deceleration belongs to the range of the low EGR rate, it is determined that the risk of the deceleration misfire is absent even in the homogeneous combustion operation, and then the processing proceeds to Step S16 and the homogeneous stoichiometric operation is executed.

In a case where it is determined in Step S18 that the EGR rate immediately before the deceleration does not belong to the range of the low EGR rate, it is determined that the risk of the deceleration misfire is present in the homogeneous combustion operation and the processing proceeds to the next step (Step S20), in which it is determined whether or not the EGR rate immediately before the deceleration belongs to the range of the predetermined medium EGR rate (such as the range of 10% to 15%). In a case where it is determined as a result of the determination in Step S20 that the EGR rate immediately before the deceleration belongs to the range of the medium EGR rate, the operation mode is switched to the stratified stoichiometric operation (Step S22). In a case where it is determined in Step S20 that the EGR rate immediately before the deceleration does not belong to the range of the medium EGR rate, it is determined that the EGR rate immediately before the deceleration belongs to the range of the high EGR rate (such as 15% or higher). Then, the processing proceeds to the next step (Step S24), in which the stratified lean operation is executed.

By the operation mode switching control being performed in accordance with the routine described above, the misfire can be effectively suppressed without the sense of deceleration at the time of the deceleration being impaired.

The invention is not limited to the embodiment described above. Instead, the invention can be put into practice after being modified in various forms without departing from the scope of the invention. For example, the invention may be put into practice after being modified as follows.

In Embodiment 1 described above, the system that is provided with the EGR device 36 which is configured as the LPL-EGR device is described. However, EGR devices that can be applied to this system is not limited to the LPL-EGR device, and the system may be one that is provided with a high pressure side EGR (HPL-EGR) device which introduces the EGR gas to an intake downstream side of the compressor 22a. This applies the same to the other embodiment to be described below as well.

In Embodiment 1 described above, the system in which the S/C 32 is placed is described. However, a configuration in which a lean NOx catalyst is placed on the exhaust downstream side of the S/C 32 is also possible. The lean NOx catalyst is a so-called occlusion reduction-type NOx catalyst, and has a storage and release effect for occluding NOx in a case where the air-fuel ratio of the exhaust gas is in a predetermined lean region and releasing the NOx in a case where the air-fuel ratio of the exhaust gas is in a rich region. Accordingly, this configuration allows NOx discharge at a time of the lean operation to be further suppressed. This applies the same to the other embodiment to be described below as well.

In Embodiment 1 described above, the system that uses the in-cylinder fuel injection valve 4 which directly injects the fuel into the combustion chamber is described. However, a port fuel injection valve that is placed in an intake port may be used in combination with the in-cylinder fuel injection valve 4. In this case, the homogeneous air-fuel mixture may be formed in the combustion chamber by the required fuel being injected from the port fuel injection valve without exception in a case where, for example, the homogeneous combustion operation is performed. In addition, in a case where the stratified combustion operation is performed, the homogeneous air-fuel mixture may be formed in the combustion chamber by some of the required fuel being injected from the port fuel injection valve and the dense air-fuel mixture layer may be formed in the vicinity of the spark plug 6 by the rest of the fuel being injected from the in-cylinder fuel injection valve 4. This applies the same to the other embodiment to be described below as well.

In Embodiment 1 described above, the presence or absence of the risk of the occurrence of the deceleration misfire is determined based on the deceleration calculated from the accelerator opening degree. However, the degree of a decrease in the required torque or the like may be used as the state quantity that has a correlation with the deceleration. This applies the same to the other embodiment to be described below as well.

In Embodiment 1 described above, the stoichiometric operation is performed in a case where the immediately preceding EGR rate is in the range of the medium EGR rate or the low EGR rate and the lean operation is performed in a case where the immediately preceding EGR rate is in the range of the high EGR rate. However, the air-fuel ratio that can be executed during the air-fuel ratio control is not limited thereto. In other words, the air-fuel ratio in a case where the immediately preceding EGR rate is in the range of the medium EGR rate or the low EGR rate is not limited to the theoretical air-fuel ratio insofar as the air-fuel ratio in a case where the immediately preceding EGR rate is in the range of the high EGR rate is leaner than the air-fuel ratio in a case where the immediately preceding EGR rate is in the range of the medium EGR rate or the low EGR rate. This applies the same to the other embodiment to be described below as well.

In Embodiment 1 described above, the EGR rate is used as the control target state quantity. However, an EGR amount by operation region may be used as the control target state quantity. This applies the same to the other embodiment to be described below as well.

In Embodiment 1 described above, the EGR device 36 corresponds to the EGR device, the in-cylinder fuel injection valve 4 corresponds to a fuel supply device, the throttle valve 26 corresponds to an air amount adjusting device, the ECU 50 corresponds to the control device, the theoretical air-fuel ratio corresponds to a first air-fuel ratio, the lean air-fuel ratio corresponds to a second air-fuel ratio, and the EGR rate as the boundary between the medium EGR rate and the high EGR rate corresponds to the first threshold. In addition, in Embodiment 1 described above, the operation mode switching control is realized by the ECU 50 executing the processing of Step S20 and Step S24 or the processing of Step S20 and Step S22.

In Embodiment 1 described above, the EGR rate as the boundary between the low EGR rate and the medium EGR rate corresponds to the second threshold. In addition, in Embodiment 1 described above, the operation mode switching control is realized by the ECU 50 executing the processing of Step S18 and Step S16 or the processing of Step S18 and Steps S22 to S24.

Hereinafter, Embodiment 2 of the invention will be described. Embodiment 2 according to the invention can be realized by the hardware configuration illustrated in FIG. 1 being used and a routine illustrated in FIG. 9 (described later) being executed by the ECU 50.

In the stratified combustion operation, the air-fuel ratio in the vicinity of the spark plug is richer than the overall air-fuel ratio in the cylinder, and thus the combustion resistance is strong with respect to the retarding of an ignition timing. Accordingly, when the degree of the retarding of the ignition timing is increased in the stratified lean operation and the stratified stoichiometric operation, the in-cylinder air amount can be further increased while the ignitability is maintained.

Figure 8:
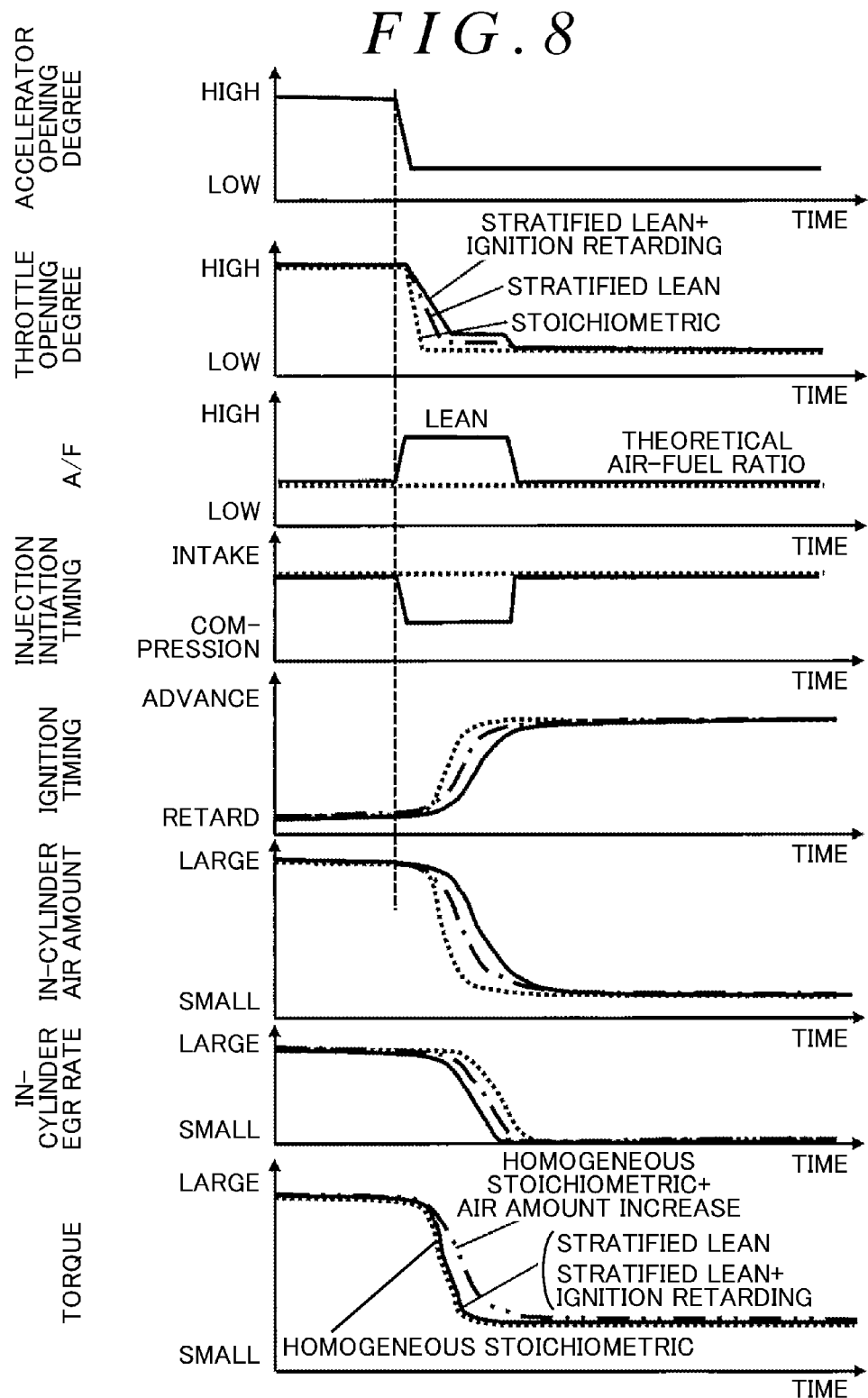
FIG. 8 is a time chart illustrating the temporal changes in the various state quantities at the time of the deceleration.

In the system according to Embodiment 2, the degree of the retarding of the ignition timing is increased by ignition timing efficiency being lowered in a case where the stratified lean operation and the stratified stoichiometric operation are performed during the deceleration at the time of the EGR introduction. FIG. 8 is a time chart illustrating the temporal changes in the various state quantities at the time of the deceleration. In the drawing, the solid lines represent a case where the ignition timing efficiency is lowered and the operation mode is switched to the stratified lean operation at the time of the deceleration, the one-dot chain lines represent a case where the operation mode is switched to the stratified lean operation at the time of the deceleration, the dotted lines represent a case where the homogeneous stoichiometric operation is maintained at the time of the deceleration, and the two-dot chain line represents a case where the air amount is increased in the homogeneous stoichiometric operation at the time of the deceleration. The ignition timing efficiency means the ratio of the torque that is actually output to the torque that can be output when the ignition timing is an optimum ignition timing, and has a maximum value of 1 when the ignition timing is the optimum ignition timing. Basically, the optimum ignition timing means a minimum advance for best torque (MBT). In a case where a trace knock ignition timing is set, the optimum ignition timing means the one of the MBT and the trace knock ignition timing that is further on a retard side. In other words, in the example illustrated in this drawing, the one-dot chain line represents a case where the stratified lean operation based on the optimum ignition timing is executed at the time of the deceleration and the solid line represents a case where the stratified lean operation based on the ignition timing further on the retard side than the one-dot chain line is executed at the time of the deceleration.

When the ignition timing efficiency is lowered, the in-cylinder air amount is increased and the ignition timing changes to the retard side compared to the optimum ignition timing such that an increase in the torque equivalent to the in-cylinder air amount increment is suppressed. Then, the in-cylinder temperature at the TDC can be further raised while the same torque is maintained, and thus the ignitability at the time of the EGR introduction can be further enhanced without the deceleration being impaired.

Hereinafter, a specific processing of the operation mode switching control described above will be described in detail based on a flowchart. FIG. 9 is a flowchart illustrating a routine for the operation mode switching control that is executed by the ECU 50 of Embodiment 2 of the invention.

The routine that is illustrated in FIG. 9 is repeatedly executed at a predetermined control cycle.

In Step S30 to Step S40 of the routine that is illustrated in FIG. 9, a processing similar to the processing of Step S10 to Step S20 illustrated in FIG. 7 is executed. In a case where it is determined as a result of the processing of Step S40 that the EGR rate immediately before the deceleration belongs to the range of the medium EGR rate, the operation mode is switched to the stratified stoichiometric operation and the ignition timing is more retarded than the optimum ignition timing (Step S42). In a case where it is determined in Step S40 that the EGR rate immediately before the deceleration does not belong to the range of the medium EGR rate, it is determined that the EGR rate immediately before the deceleration belongs to the range of the high EGR rate (such as 15% or higher). Then, the processing proceeds to the next step (Step S44), in which the operation mode is switched to the stratified lean operation and the ignition timing is more retarded than the optimum ignition timing.

When the operation mode switching control is performed in accordance with the routine described above, an increase in the in-cylinder air amount is performed by the ignition timing efficiency being lowered in the stratified lean operation and the stratified stoichiometric operation, and thus the in-cylinder temperature at the TDC can be further raised without an increase in the generated torque. Accordingly, the misfire can be effectively suppressed without the sense of deceleration at the time of the deceleration being impaired.

The invention is not limited to the embodiments described above. Instead, the invention can be put into practice after being modified in various forms without departing from the scope of the invention. For example, the invention may be put into practice after being modified as follows.

In Embodiment 2 described above, the degree of the retarding of the ignition timing is increased in the stratified lean operation and the stratified stoichiometric operation. However, the degree of the retarding of the ignition timing may be increased only in the case of the stratified lean operation where the ignitability at the time of the EGR introduction is required more than anything else.

In Embodiment 2 described above, the EGR device 36 corresponds to the EGR device, the in-cylinder fuel injection valve 4 corresponds to the fuel supply device, the throttle valve 26 corresponds to the air amount adjusting device, the ECU 50 corresponds to the control device, the theoretical air-fuel ratio corresponds to the first air-fuel ratio, the lean air-fuel ratio corresponds to the second air-fuel ratio, and the EGR rate as the boundary between the medium EGR rate and the high EGR rate corresponds to the first threshold. In addition, in Embodiment 2 described above, the operation mode switching control is realized by the ECU 50 executing the processing of Step S40 and Step S44 or the processing of Step S40 and Step S42.

In Embodiment 2 described above, the EGR rate as the boundary between the low EGR rate and the medium EGR rate corresponds to the second threshold. In addition, in Embodiment 2 described above, the operation mode switching control is realized by the ECU 50 executing the processing of Step S38 and Step S36 or the processing of Step S38 and Steps S42 to S44.

In Embodiment 2 described above, the spark plug 6 corresponds to an ignition device. In addition, in Embodiment 2 described above, an operation of the control device is realized by the ECU 50 executing the processing of Step S42 or Step S44.

What is claimed is:

1. A control device for an internal combustion engine, the internal combustion engine including an air amount adjusting device, a fuel supply device, and an EGR device, the air amount adjusting device being configured to adjust an amount of air flowing into a combustion chamber of the internal combustion engine, the fuel supply device being configured to supply a fuel into the combustion chamber, the EGR device being configure to adjust an EGR rate, the EGR rate being a ratio of exhaust gas in the air flowing into the combustion chamber, the internal combustion engine being configured to execute an operation based on a first air-fuel ratio and an operation based on a second air-fuel ratio leaner than the first air-fuel ratio by adjusting the air amount adjusting device and the fuel supply device, and the control device comprising:

an electronic control unit programmed to perform an operation mode switching control by:
i) performing the operation based on the first air-fuel ratio:
when the electronic control unit decreases the amount of the air flowing into the combustion chamber in response to a predetermined torque reduction request and decreases the EGR rate by adjusting the EGR device and
when an immediately preceding EGR rate is lower than a first threshold, the immediately preceding EGR rate being an EGR rate immediately before the torque reduction request is made, and
ii) performing a stratified combustion operation based on the second air-fuel ratio when the immediately preceding EGR rate is equal to or higher than the first threshold.

2. The control device according to claim 1, wherein the first air-fuel ratio is a theoretical air-fuel ratio.

3. The control device according to claim 1, wherein the electronic control unit is configured to:
iii) perform the stratified combustion operation when the operation based on the first air-fuel ratio is performed in the operation mode switching control and the immediately preceding EGR rate is equal to or higher than a second threshold lower than the first threshold, and
iv) perform a homogeneous combustion operation when the immediately preceding EGR rate is lower than the second threshold.

4. The control device according to claim 1, wherein the torque reduction request is a request in which a deceleration calculated from the amount of an operation of an accelerator of the internal combustion engine is equal to or higher than a predetermined threshold.

5. The control device according to claim 1, wherein the electronic control unit is configured to operate an ignition device such that an ignition timing is further on a retard side than an optimum ignition timing, when the stratified combustion operation is performed in the operation mode switching control.

* * * * *